Aug. 19, 1941.    G. H. AKLIN    2,252,681
HIGH APERTURE OBJECTIVE
Filed May 17, 1940
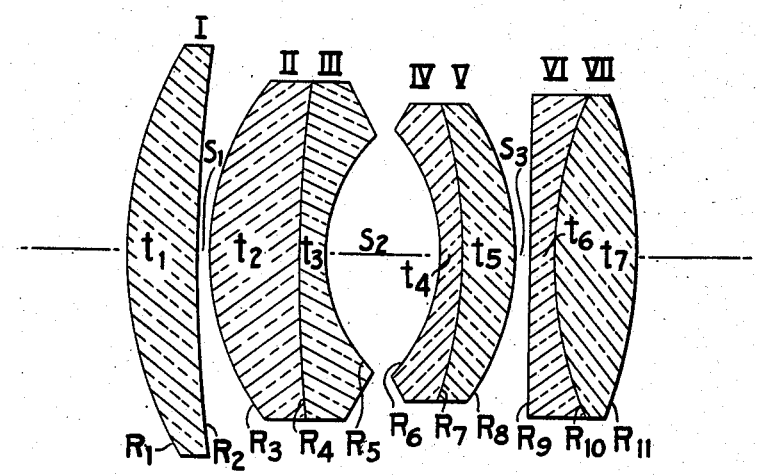
F = 100 mm    f/1.9
| LENS | GLASS | | RADII | SPACINGS |
|---|---|---|---|---|
| | $N_D$ | $\nu$ | | |
| I | 1.573 | 57.4 | $R_1 = +60.2$ mm | $t_1 = 11.3$ mm |
| | | | $R_2 = +379.2$ | $S_1 = 1.9$ |
| II | 1.611 | 57.2 | $R_3 = +42.0$ | $t_2 = 13.9$ |
| III | 1.605 | 38.2 | $R_4 = +214.0$ | $t_3 = 3.7$ |
| | | | $R_5 = +24.9$ | $S_2 = 17.8$ |
| IV | 1.689 | 30.9 | $R_6 = -27.4$ | $t_4 = 3.7$ |
| V | 1.744 | 45.8 | $R_7 = -73.1$ | $t_5 = 7.9$ |
| | | | $R_8 = -37.8$ | $S_3 = 1.9$ |
| VI | 1.689 | 30.9 | $R_9 = \infty$ | $t_6 = 3.8$ |
| VII | 1.744 | 45.8 | $R_{10} = +60.8$ | $t_7 = 12.8$ |
| | | | $R_{11} = -68.3$ | |
GEORGE H. AKLIN
INVENTOR
BY *Newton N. Perrins*
ATTORNEY Patented Aug. 19, 1941

2,252,681

UNITED STATES PATENT OFFICE 2,252,681

HIGH APERTURE OBJECTIVE

George H. Aklin, Rochester, N. Y., assignor to Eastman Kodak Company, Rochester, N. Y., a corporation of New Jersey Application May 17, 1940, Serial No. 335,782

7 Claims. (Cl. 88—57)

This invention relates to lenses and particularly to high aperture photographic objectives.

It is an object of the invention to provide a high aperture lens with high covering power and good correction for the various aberrations including spherical aberration, chromatic aberration, lateral color, curvature of field, astigmatism, sine condition, coma, distortion, Petzval condition, ghost images, vignetting and flare.

It is a specific object of the invention to provide an f/1.9 lens with a flat field, good correction for spherical aberration and good rim ray agreement.

It is an object of a preferred embodiment of the invention to give exceptionally good correction for field, for rim rays and for coma. In fact, I have found that when this invention is employed, the color being maintained substantially zero, the astigmatism is negligibly small and the definition at the corners of the image field is as good or better than at the center.

Lenses may be divided into certain types which in general are readily recognized by the lens designer although in a few rare borderline cases it is perhaps a little difficult to state definitely to just what class a lens belongs. However, the present invention quite definitely belongs to a known type of lens, namely, that having four components the outer two of which are positive and usually but not always single elements and the inner two are meniscus highly concave to a diaphragm therebetween. Reference is made to my copending applications, Serial Nos. 335,783 and 335,784, that of Maximilian J. Herzberger, Serial No. 335,785, and that of Frederick and Herzberger, Serial No. 335,786, all filed concurrently herewith.

According to the present invention, which is primarily concerned with the third and fourth components, the lower rim ray agreement and the spherical aberration are improved by making the third component of this type of lens of a high index glass, making this component thin and making its cemented surface negatively curved. The third component is generally a doublet but may of course be more complex provided the doublet is included according to the invention. The front element of the doublet should be negative and have an index of refraction greater than 1.60 preferably greater than 1.65 and the rear element should be positive and have an index at least .04 greater than that of the front element. The cemented surface should have a radius of curvature between $-.5F$ and $-5F$ where F is the focal length of the objective and the minus sign indicates that it is concave to the incident light. The thickness of the doublet, in fact of the whole component, should be less than .15F.

According to one preferred embodiment of the invention, the above features are introduced and the front component of the lens is made of low index glass preferably between 1.55 and 1.59, which, in the absence of the above features, would cause under-correction of spherical aberration, but which in the present case produces a much flatter field than previously available without excess spherical aberration.

According to another preferred embodiment of the invention, the upper rim ray and coma corrections can be improved when the third component is made according to the invention, by making the fourth component compound with a cemented surface whose radius of curvature is between $+.4F$ and $+F$ and which is the surface of separation between two elements the front one of which is negative and has an index of refraction at least .04 less than that of the rear positive element. Preferably this rear component should also be made of high index glass, the front element being greater than 1.60 and preferably greater than 1.65 which limits happen to be the same as for the third component.

It will be noted that the cemented surfaces, one negatively and the other positively curved, in the third and fourth components are both fairly strong and both are between a fairly high index front element and a still higher index rear element. Combining the two preferred embodiments of the invention, i. e. the low index front component and the compound rear component gives a lens in which the field flatness, the astigmatism and the lower rim ray are all practically perfect and much better than is usually tolerated and the other aberrations including coma, color and spherical aberration are all within tolerance limits. The result is a lens which gives good definition right out to the corners of the image field.

In the accompanying drawing there is shown:

A lens incorporating all of the preferred features of the invention.

The specifications corresponding to the lens shown in the drawing are as follows:

F=100 mm.                                                      f/1.9

| Lens | Glass | | Radii | Spacings |
|---|---|---|---|---|
| | $N_D$ | $\nu$ | | |
| I | 1.573 | 57.4 | $R_1 = +60.2$ mm. | $t_1 = 11.3$ mm. |
| | | | $R_2 = +379.2$ | $s_1 = 1.9$ |
| | | | $R_3 = +42.0$ | $t_2 = 13.9$ |
| II | 1.611 | 57.2 | $R_4 = +214.0$ | |
| III | 1.605 | 38.2 | | $t_3 = 3.7$ |
| | | | $R_5 = +24.9$ | $s_2 = 17.8$ |
| | | | $R_6 = -27.4$ | |
| IV | 1.689 | 30.9 | $R_7 = -73.1$ | $t_4 = 3.7$ |
| V | 1.744 | 45.8 | | $t_5 = 7.9$ |
| | | | $R_8 = -37.8$ | $s_3 = 1.9$ |
| | | | $R_9 = \infty$ | |
| VI | 1.689 | 30.9 | $R_{10} = +60.8$ | $t_6 = 3.8$ |
| VII | 1.744 | 45.8 | $R_{11} = -68.3$ | $t_7 = 12.8$ |

It will be noted that in the above specifications, the refractive index difference, sometimes called index break, at the cemented surfaces in each of the third and fourth components is .055. The thickness of the third component is .116F. $R_7$ and $R_{10}$ are relatively strong namely .73F and .61F respectively. Also, the front component has an index of refraction of 1.573. The curvature of the front surface of the rear component is not critical and can vary anywhere from infinity to +F. Similarly the rear surface can vary anywhere from —.5F to infinity but of course, the rear component must have a certain power and hence $$\frac{1}{R_9} - \frac{1}{R_{11}} \text{ should always be greater than } \frac{1}{F}.$$

Having thus described the most preferred embodiment of my invention, I wish to point out that it is not limited to the specific structure but is of the scope of the appended claims.

What I claim and desire to secure by Letters Patent of the United States is:

1. A photographic objective of the type having four components separated by air and axially spaced of which the two outer ones are positive and the two inner ones are menisci highly concave toward a diaphragm therebetween, characterized by the third component immediately behind the diaphragm being a doublet with its cemented surface concave to the diaphragm and having a radius of curvature between —.5F and —5F where F is the focal length of the objective, the front element of the doublet being negative and having an index of refraction greater than 1.60, the rear element of the doublet being positive and having an index of refraction at least .04 greater than that of said front element and the axial thickness of the doublet being less than .15F.

2. A photographic objective according to claim 1 in which the index of refraction of said front element of the doublet forming the third component is greater than 1.65.

3. A photographic objective according to claim 1 in which the front component has an index of refraction between 1.55 and 1.59.

4. A photographic objective according to claim 1 in which the rear component is a doublet consisting of a negative element with an index of refraction greater than 1.60 cemented to the front of a positive element with an index of refraction at least .04 greater than that of the negative element, the cemented surface being convex toward the diaphragm and having a radius of curvature between +.4F and +F.

5. A photographic objective of the type having four components separated by air and axially spaced of which the two outer ones are positive and the two inner ones are menisci highly concave toward a diaphragm therebetween characterized by the rear meniscus being a doublet with a cemented surface concave toward the diaphragm having a radius of curvature between —.5F and —5F where F is the focal length of the objective, the front element of the doublet being negative and having an index of refraction greater than 1.60, the rear element of the doublet being positive and having an index of refraction at least .04 greater than that of said front element and the axial thickness of the doublet being less than .15F and by the rear outer component also being a doublet consisting of a negative element with an index of refraction greater than 1.60 cemented to the front of a positive element with an index of refraction at least .04 greater than that of the negative element, the cemented surface of said rear component being convex toward the diaphragm and having a radius of curvature between .4F and F.

6. A photographic objective according to claim 5 in which the front component has an index of refraction between 1.55 and 1.59.

7. A photographic objective according to claim 5 in which the third and fourth components consist entirely of glasses whose indexes of refraction are greater than 1.65.

GEORGE H. AKLIN.